(12) United States Patent
Sacca et al.

(10) Patent No.: US 6,810,790 B1
(45) Date of Patent: Nov. 2, 2004

(54) AUTOMATIC APPARATUS FOR FAST COOKING DRY FOOD AT ATMOSPHERIC PRESSURE

(75) Inventors: Salvatore Sacca, Locate Varesino (IT); Ennio Trombetta, Bareggio (IT)

(73) Assignee: Omega s.r.l. (IT)

( * ) Notice: Subject to any disclaimer, the term of this patent is extended or adjusted under 35 U.S.C. 154(b) by 0 days.

(21) Appl. No.: 10/433,019

(22) PCT Filed: Nov. 28, 2000

(86) PCT No.: PCT/IT00/00480

§ 371 (c)(1),
(2), (4) Date: Nov. 5, 2003

(87) PCT Pub. No.: WO02/43538

PCT Pub. Date: Jun. 6, 2002

(51) Int. Cl.[7] .............................. A23L 1/00; A47J 27/00; A47J 27/16; A47J 27/18; A47J 43/04

(52) U.S. Cl. .............................. 99/330; 99/331; 99/352; 99/355; 99/403; 99/407

(58) Field of Search .................... 99/326–332, 352–355, 99/403–410, 337, 338, 411–417, 400, 401; 426/509, 510, 523, 557, 458, 496

(56) References Cited

U.S. PATENT DOCUMENTS

| | | | |
|---|---|---|---|
| 4,901,632 A | | 2/1990 | Lori |
| 5,010,806 A | * | 4/1991 | Narcisi et al. ................. 99/357 |
| 5,033,364 A | * | 7/1991 | Narcisi et al. ................. 99/330 |
| 5,172,627 A | * | 12/1992 | Narcisi et al. ................. 99/330 |
| 5,215,001 A | * | 6/1993 | Narcisi ......................... 99/357 |
| 5,351,605 A | * | 10/1994 | Sai et al. ....................... 99/330 |
| 5,361,682 A | | 11/1994 | Crolla |
| 6,360,652 B1 | * | 3/2002 | Cusenza et al. .............. 99/330 |
| 6,530,307 B2 | * | 3/2003 | Cusenza et al. .............. 99/330 |
| 6,663,907 B1 | * | 12/2003 | Pratolongo ................... 426/509 |

FOREIGN PATENT DOCUMENTS

| | | |
|---|---|---|
| EP | 0 296 549 A | 12/1988 |
| WO | WO 92/18040 | 10/1992 |

* cited by examiner

Primary Examiner—Timothy F. Simone
(74) Attorney, Agent, or Firm—Muserlian, Lucas and Mercanti

(57) ABSTRACT

An automatic apparatus for cooking dry food, particularly legumes and alimentary pasta is disclosed. The apparatus has at least four intercommunicable cooking chambers arranged in cascade, one above the other and each one provided at the bottom with a piping for supplying hot water furnished by a boiler by means of a common pipe and at the top with the same number of vents connected to a common pipe for conveying vapor to a heat exchanger. The first cooking chamber at the top is provided upstream with a feeding valve and downstream with a discharging valve, whereas each one of the underlying cooking chambers is provided with a lower shutter for discharging the content of the chamber which, at the exit of the last chamber is the cooked food as programmed on the control board.

9 Claims, 2 Drawing Sheets

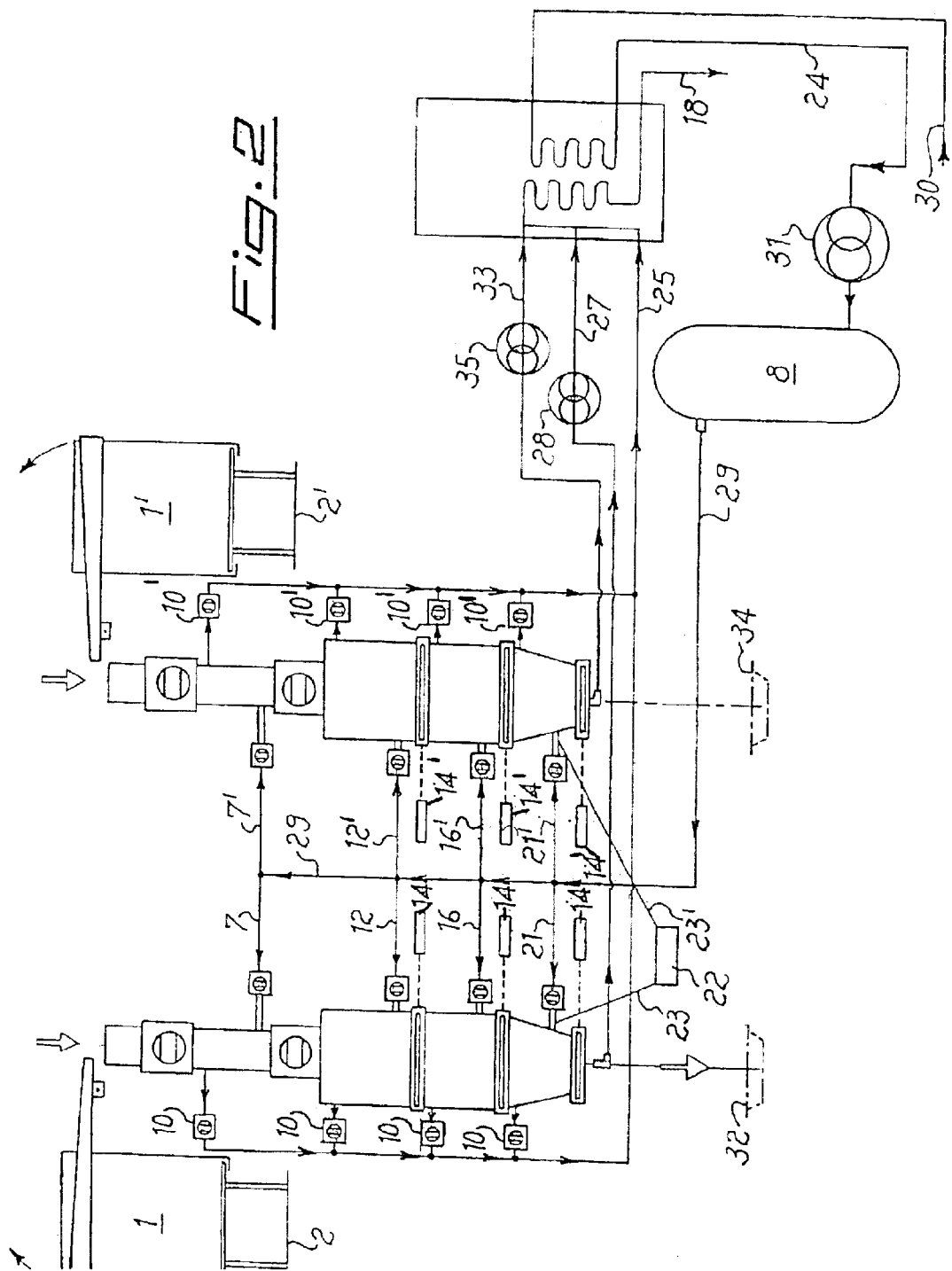

US 6,810,790 B1

AUTOMATIC APPARATUS FOR FAST COOKING DRY FOOD AT ATMOSPHERIC PRESSURE

This patent application claims the benefit of priority from PCT Application Ser. No. PCT/IT/00/00480 filed Nov. 28, 2000, the contents of which are incorporated herein by reference.

BACKGROUND OF THE INVENTION

The present invention relates to an automatic apparatus that enables the fast and programmed cooking of dry food, particularly of pasta and legumes, by operating at atmospheric pressure.

The fast cooking of dry food, and particularly of alimentary pasta, has always been the aspiration of the cooks in the kitchens of restaurants, spaghetti shops, large communities and other similar organizations, wherein the quickness of the service is an essential requirement for success because of the high number of ready dishes to be served.

Automatic apparatuses for cooking dry alimentary pasta by operating at pressures higher than atmospheric pressure are already known. For example, similar apparatuses are described in Italian patent no. 1,207,735 and in U.S. Pat. No. 5,142,966. Obviously, such known apparatuses are not free from the typical drawbacks of the equipments operating at high pressure. These drawbacks are for example those due to lacks of tightness which are particularly serious when it is operated at pressures of seven or eight bars and temperatures of 140–150° C.

SUMMARY OF THE INVENTION

Therefore, an object of the present invention is to provide an automatic apparatus enabling the fast cooking of alimentary pasta and other dry food, which is free from the above mentioned drawbacks of the apparatuses operating at superatmospheric pressure. Said object is obtained according to the present invention with an apparatus whose features are specified in claim 1. Other features of the apparatus are specified in the following claims.

The apparatus for fast cooking according to the present invention offers the advantage that it can be easily controlled by simple pressure on the suitable buttons provided in a control board governed by a suitable software.

Another advantage of the cooking apparatus according to the present invention includes the remarkable possibilities to comply with hygienic rules. As a matter of fact neither the pasta nor the water or waterproof container thereof gets in contact with the operator's hands.

A further advantage offered by the cooking machine according to the present invention is that it ensures a cooking regularity which is maintained precisely for the whole period of the apparatus working.

These and other advantages and features of the automatic apparatus according to the present invention will appear to those skilled in the art from the following detailed description of one embodiment thereof with reference to the accompanying drawings.

BRIEF DESCIPTION OF THE DRAWINGS

FIG. 2 shows an analogous view of two identical apparatuses which are coupled in order to be supplied with two different kinds of pasta and therefore to provide dishes of different pasta, for instance spaghetti and rigatoni, which require different cooking times.

DETAILED DESCRIPTION OF THE INVENTION

Figure 1:
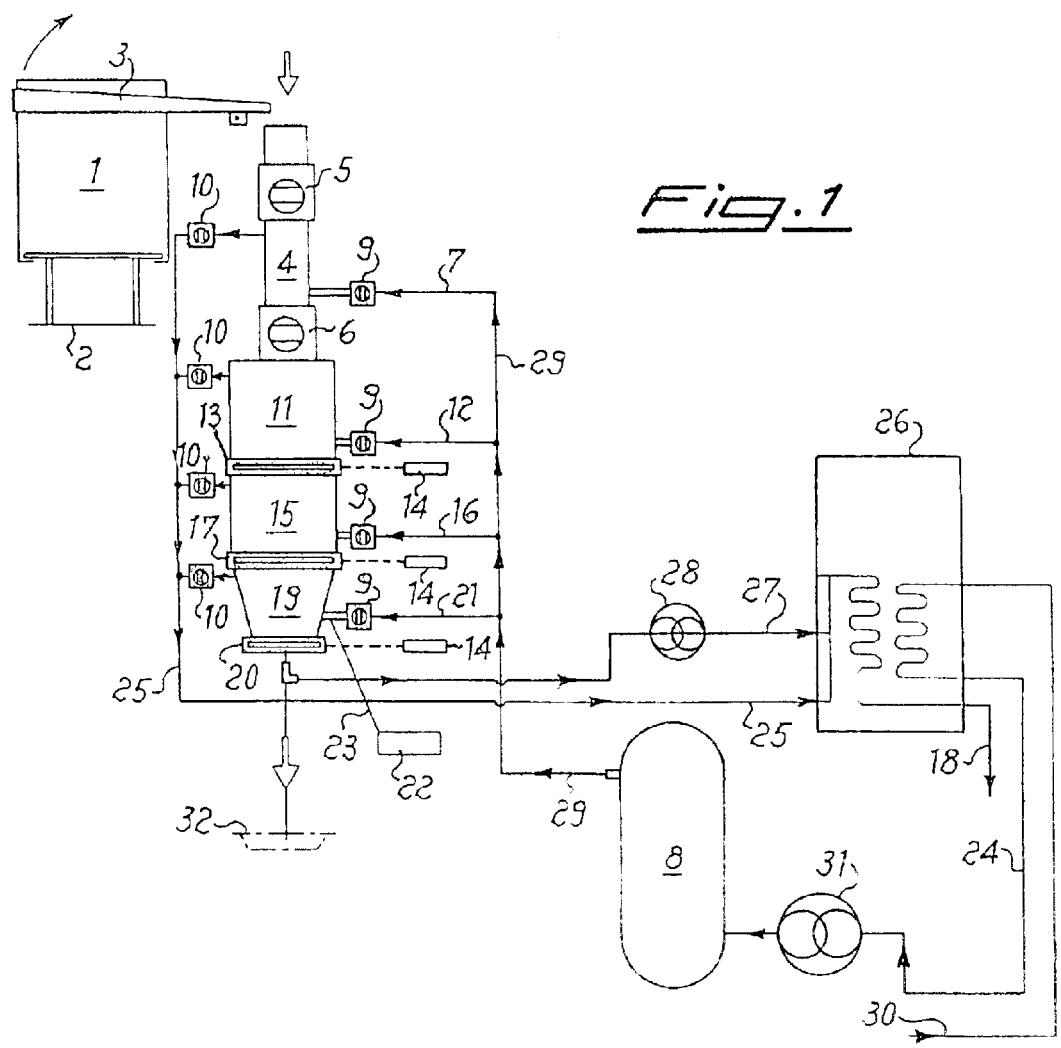
FIG. 1 shows a schematical view in side elevation of an apparatus according to the present invention.

With reference to FIG. 1, there is shown that the apparatus according to the present invention is supplied by a container 1, wherein the pasta which then will have to be cooked by request is arranged. The container is provided with a ram 2 operated by an electric motor (not shown), which pushes upwards the pasta contained in container 1. The pasta is pushed upwards until it reaches a chute provided with a vibrating mechanism, from which it comes to a cradle provided with weighting device (not shown). When the pasta contained in the cradle reaches the programmed weight, a valve (not shown) closes and a turning-over device 3, pneumatically operated, arises with a movement shown by the arrow in FIG. 1. When the turning-over device 3 reaches the vertical position, the pasta contained in the cradle slides downwards according to the other arrow shown in the drawing and descends into the first cooking chamber 4.

Cooking chamber 4 is provided upstream with a supplying valve 5 and downstream with an discharging valve 6. The upstream supplying valve 5, when in the open position, enables the pasta to arrive into cooking chamber 4 after having been let off from tuning-over member 3. Valve 5 immediately closes after the entry of the pasta into chamber 4, in order to allow a first cooking thereof.

The inside of chamber 4 is supplied with hot water through piping 7 connected to a boiler 8 by means of a common pipe 29. The inflow of hot water into chamber 4 is controlled by a valve 9. Chamber 4 is upperly provided also with a vent valve 10 having the purpose of avoiding a pressure increase inside the chamber itself.

When the pasta has reached the programmed first cooking grade inside chamber 4, valve 6 opens, operated by suitable controls governed by the device software. The pasta descends into chamber 11 whose structure is similar to that of chamber 4, but with a different shape. As a matter of fact chamber 11 has a diameter which is about double with respect to that of chamber 4, because inside chamber 4 the pasta, for instance the long pasta, is in the vertical position whereas inside chamber 11 it takes the horizontal position since it has already been partly cooked. The water inside chamber 11 is also supplied by the single boiler 8 through piping 12 and serves mainly for filling chamber 11. Further, it serves for conferring a vortical movement to the water which is therein provided. In this way the cooking of the pasta, suspended inside chamber 15 and stirred by said movement, is rendered regular.

The bottom of chamber 11 is closed by a guillotine shutter 13 controlled by a pneumatic piston 14. The guillotine shutter 13 closes chamber 11 in a watertight way and when it opens, it lets off the pasta and the water into underlying chamber 15.

Chamber 15 is supplied through piping 16 with hot water which, also in this case, besides filling the inside of chamber 15, serves for conferring a vortical movement to the water therein provided.

Chamber 15 is also provided with a guillotine shutter 17 controlled by pneumatic piston 14. In chamber 15 the pasta reaches almost the programmed cooking grade. The cooking at the programmed grade is carried out in the underlying chamber 19 which is also provided with shutter 20 and with a piping 21 for water supply. Also in this case, the function of the water is filling the content of chamber 19 and conferring a vortical movement to the pasta therein suspended.

During the time the pasta is in chamber 19, the pasta reaches the programmed final cooking grade and at the same time it is also salted. To this purpose, a container 22 of salted water connected by a small tube 23 to piping 21 downstream of valve 9 is provided. When valve 9 opens in order to let hot water into chamber 19, the programmed water quantity is sucked from container 22 through small tube 23. Obviously, the percentage of salt in the water contained inside container 22 will be previously regulated according to the needs and other variables of the cooking process and to the prevalent tastes.

Each of the cooking chambers 11, 15 and 19 is provided with a vent valve 10 having the same function described with reference to cooking chamber 4. The inflow pipings downstream of each one of said valves form a single line 25 conveying vapor inside a heat exchanger 26. To the same exchanger 26 arrives the piping 27 that carries the final cooking water discharged from chamber 19 by draining pump 28.

Draining pump 28 is connected to the control board so as to allow collection of a determined quantity of cooking water, so that the cooked pasta is still soaked for allowing a further grade of cooking thereof and maintaining it wet for the successive operations of sauce addition. The pasta is discharged from the bottom of chamber 19, preferably over a dish 32 arranged under it and ready for being consumed, after addition of the sauce.

The machine is preferably provided with an exchanger 26 which enables most of the heat of the discharged cooking water to be recovered. As a matter of fact also the piping 30 which supplies city water to the boiler 8 arrives to heat exchanger 26. Inside exchanger 26, the temperature of the city water is increased by the recovered heat and by means of supplying pump 31 it is introduced through piping 24 into boiler 8 wherein it is further heated for continuing the cooking cycle.

The city water is preferably demineralized before arriving to exchanger 26. All the cooking chambers are obviously provided with suitable insulation and also of thermostats. All the regulating members, valves and other similar devices are connected to a control board wherein the cooking time, and therefore the desired cooking grade, as well as the quantity of pasta to be taken from container 1 can be set.

The cooking water is definitively discharged outside of the apparatus through discharge tube 18.

With reference to FIG. 2 there is shown that, in order to allow the automatic cooking of two different kinds of pasta, which are characterized by different cooking times, the apparatus according to the present invention is coupled to an identical one, as it is clear in FIG. 2. As it can be seen, the two apparatuses are coupled so that they are mirror images of each other and both are supplied by means of the only boiler 8. The respective cooking waters, through the respective pipings 27 and 33 and the discharge pumps 28 and 35 arrive together to the exchanger 26 which is only one for both the coupled apparatuses. The same construction can be devised for cooking three or more different kinds of pasta or other dry food. By the simplified apparatus in FIG. 2, it is possible to fill at the same time dishes 32 and 34 with different pasta, for example one with spaghetti and the other one with rigatoni.

An essential feature of the apparatus according to the present invention is that the cooking chambers are four and are arranged in cascade. With this arrangement a partial cooking of four different charges takes place and this enables to obtain dish of cooked food every 50–80 seconds according to the kind of food which is used. Obviously the number of the cooking chambers can be higher than four, also five can be obtained, also six can be obtained with a cost increase but with a reduction of the discharge time of the dish of cooked pasta. The use of a device with three cooking chambers requires times for the preparation of a dish of cooked food that are not competitive.

The cascade arrangement of the four cooking chambers offers the further advantage of preventing breakage of the long pasta, for instance spaghetti, during passage from one chamber to another and also during the other cooking operations.

As already said above, the apparatus according to the present invention has been devised for automatic cooking pasta and legumes, but it can also be used for cooking other dry food. For this purpose it is possible to modify the apparatus for making it suitable for the particular food to be cooked. In facts, additions and/or modifications can be made by those skilled in the art to the structure hereby illustrated and described, considering that this is a preferred but not limiting embodiment of the present invention.

What is claimed is:

1. An automatic apparatus for cooking dry food, formed of at least four intercommunicable cooking chambers (4, 11, 15, 19) arranged in cascade one above the other, each one provided at the bottom with a piping (7, 12, 16, 21) for supplying hot water furnished by a boiler (8) by means of a common pipe (29) and at the top with the same number of vents (10) connected to a common pipe (25) for conveying vapor to a heat exchanger (26), the first cooking chamber (4) at the top being provided upstream with a feeding valve (5) and downstream with a discharging valve (6), and each one of the underlying cooking chambers (11, 15, 19) is provided with a lower shutter (13, 17, 20) for discharging the content of the chamber.

2. An automatic cooking apparatus according to claim 1, characterized in that a container for the dry food to be cooked is arranged upstream of the first cooking chamber (4), said container (1) being provided with an automatic weighting device and a device for automatically dispensing the food to be cooked at the upper opening of the first cooking chamber (4).

3. An automatic cooking apparatus according to claim 2, characterized in that the container (1) is provided with a device (2) for pushing the food to be cooked towards a turning-over device (3) which pours the food to be cooked into the opening of the first cooking chamber (4).

4. An automatic cooking apparatus according to claim 2, characterized in that the automatic weighting device inside container (1) is connected to a control board of the apparatus.

5. An automatic cooking apparatus according to claim 1, characterized in that it is provided with a pump (28) for sending hot water to a heat exchanger (26) whereinto water is supplied, the water heated inside the heat exchanger (26) being supplied by means of a pump (31) to the boiler (8).

6. An automatic cooking apparatus according to claim 1, characterized in that it comprises a container (22) of salted water which is mixed with the hot water supplied into the last cooking chamber (19) through the piping (21).

7. An automatic cooking apparatus characterized in that it comprises at least two apparatuses according to claim 1, supplied with hot water from a single boiler (8) and connected to a single heat exchanger (26) by means of two different pipings (27, 33) and two pumps (28, 35).

8. The automatic cooking apparatus of claim 1, wherein the food is legumes.

9. The automatic cooking apparatus of claim 1, wherein the food is pasta.

* * * * *